Feb. 6, 1951 A. M. WIGGINS ET AL 2,540,851

PIEZOELECTRIC DEVICE

Filed Nov. 22, 1946 2 Sheets-Sheet 1

INVENTORS.
ALPHA M. WIGGINS &
FRED S. LEWIS
BY Oltsch & Knoblock
ATTORNEYS.

Feb. 6, 1951 A. M. WIGGINS ET AL 2,540,851

PIEZOELECTRIC DEVICE

Filed Nov. 22, 1946 2 Sheets-Sheet 2

INVENTORS.
ALPHA M. WIGGINS &
FRED S. LEWIS.
BY Oltsch & Knoblock
ATTORNEYS.

Patented Feb. 6, 1951

2,540,851

UNITED STATES PATENT OFFICE 2,540,851

PIEZOELECTRIC DEVICE

Alpha M. Wiggins, Clay Township, St. Joseph County, and Fred S. Lewis, South Bend, Ind., assignors to Electro Voice, Inc., Buchanan, Mich., a corporation of Indiana Application November 22, 1946, Serial No. 711,670

22 Claims. (Cl. 171—327)

This invention relates to improvements in piezo-electric devices, and more particularly to drives for piezo-electric devices. These drives are of the type adapted either to impart mechanical movement to the piezo-electric device for electrical energization thereof, for example, in a vibration pick-up mechanism, or for use in a vibration producing electrically energized device. Examples of vibration pick-ups are the pick-up mounted in the tone arm of a phonograph or record player and microphones or like acoustic transducers. An example of a vibration producing electrically energized device is a loud speaker.

Various devices for piezo-electric devices have been developed heretofore, but each has had some limitation or disadvantage. The best known drives either require the use of two piezo-electric devices cemented together in face engagement and oriented 90 degrees from each other with reference to their chemical-electric characteristics or properties, or are adapted to be actuated only by reciprocatory movement of a drive member in a path perpendicular to the plane of the piezo-electric element and at its center, the movement of which member acts upon means adapted to translate the reciprocation into a tensioning action upon the piezo-electric device in one direction and a compressing of the piezo-electric device in a direction displaced approximately 90 degrees from the tensioning action.

This invention relates to a device operating upon an entirely new principle for driving a piezo-electric device and is characterized by the advantages of simplicity of construction, low cost of the complete unit, a minimum requirement with respect to the amount of piezo-electric material used, and a high electrical output or performance level.

A further object is to provide a device of this character having a piezo-electric element and a mechanical element connected thereto wherein rotation of one element relative to the other is translated into forces acting upon the piezo-electric element to tension or stretch the same along one longitudinal axis thereof and to compress the same along an angularly disposed longitudinal axis for the purpose of producing an electrical voltage, or which is adapted to translate electrical impulses applied to the piezo-electric device into rotation of the mechanical element.

A further object is to provide a device of this character in which the force applied by a rocking driving member is multiplied by the means for translating that vibration or movement into the voltage producing distortion of the piezo-electric device.

A further object is to provide a device of this character which gives a good electrical stability whereby no voltage is generated in the piezo-electric device incident to vibrations imparted thereto except the vibration of the driving element of the device in driving direction.

A further object is to provide a device of this character having a translating member which may be made from any one of a number of different materials, such as metal stampings, plastic moldings, bent wire or the like.

Other objects will be apparent from the following specification.

Figure 1:
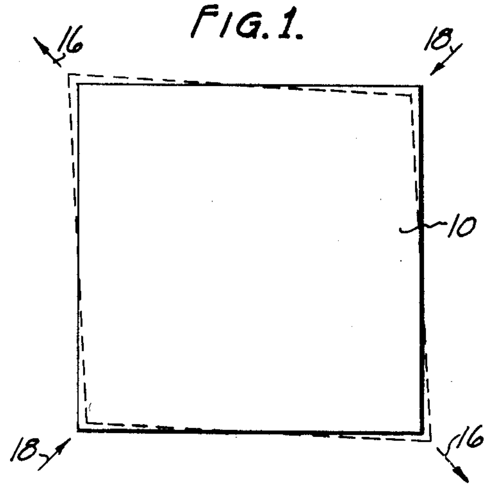
Fig. 1 is a diagrammatic face view of a piezo-electric element.
Figure 2:
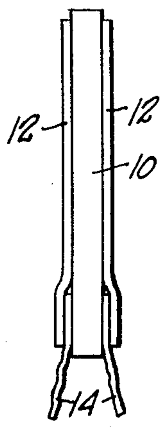
Fig. 2 is an edge view of a piezo-electric element.

Referring to the drawings, and particularly to Figs. 1 and 2, the numeral 10 designates a piezo-electric element, such as a Rochelle salt crystal, a quartz crystal, or an ammonium dihydrogen phosphate crystal. It will be understood, however, that other piezo-electric elements than those enumerated above may be used in this invention. The element 10 is preferably formed of square or rectangular outline although other shapes or outlines, such as a trapezoidal shape, may be used if desired. The piezo-electric element 10 has electrodes 12 adhered to its opposite faces, which electrodes may be formed of any suitable material, such as a coating of carbon, a metallic film, or metal foil, such as gold or silver. The essential requirement of the electrodes is that they shall adhere throughout their full extent to the faces of the piezo-electric element and avoid spacing thereof from the face of the element which would tend to produce deleterious capacitive electric results or effects. A pair of electrical leads 14 are electrically connected to the opposite electrodes 12 in any suitable manner. Thus the leads 14 may be cemented to the crystal and the electrodes 12 adhered thereto for a good electrical contact. Any suitable construction to accomplish this purpose may be employed.

The operation of the piezo-electric element 10 for the purpose of generating an electrical current entails the application of distorting pressure or tension thereto. Such distortion is illustrated diagrammatically in Fig. 1 and entails the tensioning or stretching of the element along the diagonal thereof designated by the arrows 16 and the compression of the element in its plane along the diagonal and in the direction designated by the arrows 18. Thus any application of force to the element 10 in a manner tending to distort the same in its plane from the normal outline thereof illustrated in full lines, to an outline similar to or in the nature of that illustrated in dotted lines in Fig. 1, serves to energize the piezo-electric element and to cause the generation of a voltage therein which can be tapped by the leads 14.

Figures 3, 4, 5, 6:
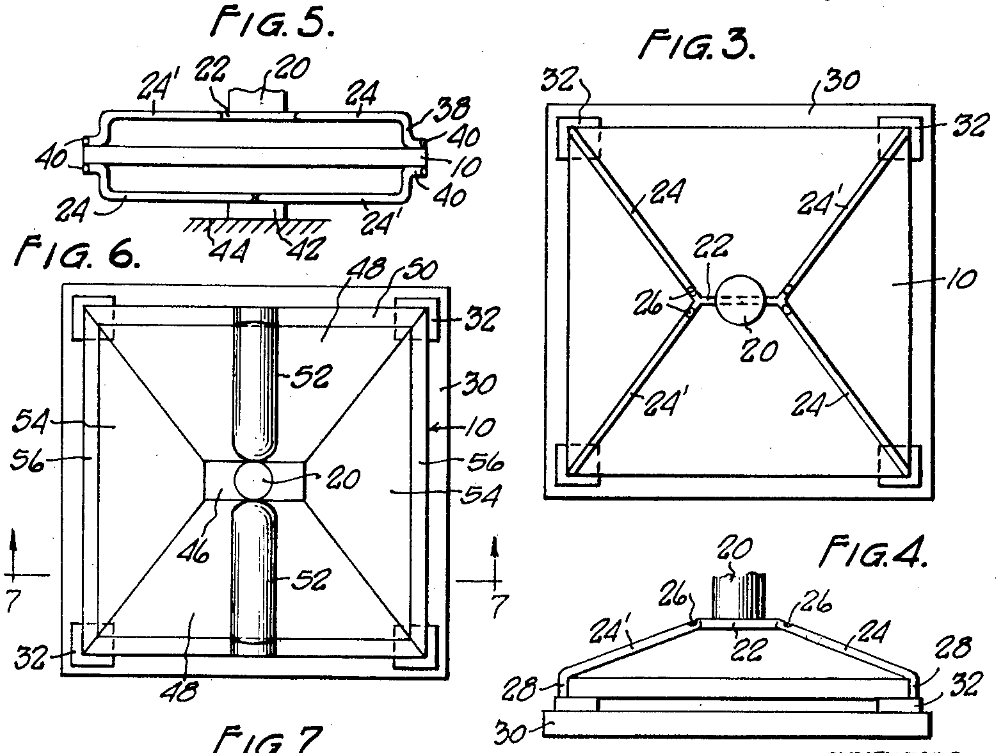
Fig. 3 is a face view of one embodiment of my device.
Fig. 4 is an edge view of the embodiment shown in Fig. 3.
Fig. 5 is an edge view of another form which the embodiment in Fig. 3 may take.
Fig. 6 is a face view of another embodiment of the invention.

It is the purpose and object of this invention to apply a distorting force to the piezo-electric element 10 of the character illustrated diagrammatically in Fig. 1 by a force transmitting mechanism which is energized by a rotatable member. One form of such a device is illustrated in Figs. 3 and 4, wherein the rotating drive element is designated 20 and may constitute a pin or stud shaft which mounts an elongated member (not shown) carrying a stylus (not shown) which traverses an undulant path, such as the path defined by the grooves of a phonograph record. Alternatively, in a vibration producing device, the drive element 20 serves to activate the diaphragm of a loud speaker, a phonograph record-cutting head or other electro-mechanical or electro-acoustical device. These parts are so arranged in a vibration pick-up, for example, that the activating vibrations are transmitted by the arm to the pin or shaft 20 in a manner to produce slight rotative movement of said pin or shaft 20 about its axis. The translating means illustrated in Figs. 3 and 4 comprises a harness unit which is formed of wire or rigid strip material and is secured rigidly at a short central portion 22 thereof to the shaft or pin 20, said portion 22 preferably being spaced from the face of the piezo-electric element 10. From each end of the part 22 extend diagonal arms 24 and 24′ which are joined in force transmitting relation to the member 22 and which extend to adjacent corners of the element 10. Said members 24 and 24′ preferably constitute wires or rigid strips, and the joint between the same and the member 22 may be rendered somewhat flexible by notching the same at 26. The outer ends of the wire members 24 and 24′ may be turned downwardly at 28 to engage the edges of the element 10 at the corners thereof. Any suitable mounting may be provided at the opposite face of the element 10, such as the mounting plate 30, which carries resilient seating members 32 to which the corners of the element 10 are secured. The members 32 will preferably be formed of a resilient or compliant material. Examples of such material which are usable in this manner are rubber, synthetic rubber, "Vinylite" and "Viscoloid." This arrangement permits the members 32 to provide resilient seats for the element 10, to permit compliance, to act as a damping means upon the element 10, and to support the element 10.

It will be observed that by virtue of this construction any vibration imparted to the pin or shaft 20 by a vibrating pick-up element (not shown) rotates the pin or shaft 20 about its axis. Rotation of the pin or shaft 20 about its axis applies a tensioning force upon the two members 24 which are located diagonally opposite each other and simultaneously applies a compressive action or pull upon the other two diagonally related harness members 24′ when the rotation of the member 20 is in the direction of the arrow shown in Fig. 3. Rotation in the reverse direction will apply a tensioning force through the members 24′ and a compressive force through the members 24. Therefore, it will be observed that any rotation of the shaft or pin 20 tends to distort the element 10 in the manner illustrated diagrammatically in Fig. 1. The reverse operation occurs when the piezo-electric element is used as a vibration producing device so that when an electrical current is applied to the leads 14 of the element 10, variations thereof will vary the distortion of the element 10 and thereby cause the production of a vibrating rotation of the element 20 when the forces of distortion of the element 10 are transmitted through the harness 22, 24, 24′.

The same general arrangement of parts hereinabove described with reference to Figs. 3 and 4 may be used similarly in the manner illustrated in Fig. 5, wherein the arms 24, 24′ extend in coplanar relation from the central member 22 which is connected to the pin or shaft 20. The outer ends of the arms 24 and 24′ are bent inwardly at 38 and thence outwardly at 40 for face engagement with the element 10. This type of harness may be applied to a crystal which is mounted upon a base similar to the member 30 by means of the resilient compliant members 32 as shown in Fig. 4.

An alternative type of mounting which may be used with any of the embodiments of the invention is also illustrated in Fig. 5. Thus a harness comprising the members 22, 24 and 24′ is secured to the face of the crystal opposite that to which the first mentioned harness attached to the shaft or pin 20 is secured. This second harness mounts a pin or stud 42 which is fixedly secured to a stationary mounting member 44 illustrated diagrammatically. The advantage of this construction will readily be apparent since two harnesses are provided at opposite sides of the crystal, thereby permitting multiplication of the forces acting in the device by virtue of that duplication. Stated differently, assuming that the device is used in a vibration pick-up, the forces acting upon the pin or stud 20 are transmitted to the element 10 by the harness 22, 24, 24′ connected with that pin or stud, and the tendency of the element 10 to rotate incident to the application of those forces acts upon the opposed harness connected by the member 42 with the support 44 whose resilience absorbs the tendency of the element 10 to rotate, and incident to that absorption converts those forces so absorbed into forces acting upon the supported face of the crystal equally and in the same manner as the forces applied by the stud or pin 20 act upon the element 10. This avoids any tendency to warp the element 10 out of its plane.

In each of these embodiments and in the other embodiments to be described hereafter, the portions of the harness which contact the element 10 are secured thereto by a suitable cement. This cement may be of any type desired so long as it is characterized by negligible cold flow properties so that the tensioning and pressing forces applied by the harness element or elements are transmitted to the element 10 without danger of lost motion or free play at the cemented point or points.

Figure 7:
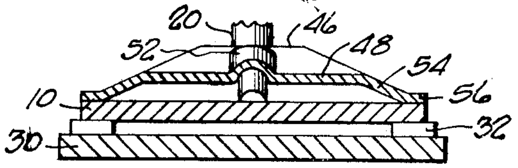
Fig. 7 is a transverse sectional view taken on line 7—7 of Fig. 6.

Another embodiment of the invention is illustrated in Figs. 6 and 7 wherein, for purposes of convenience, the element 10 has been illustrated as mounted upon a backing plate 30 by members 32 of the character hereinbefore described. It will be understood, however, that a mounting of the type illustrated in Fig. 5 may be used in this device if desired. The motion transmitting means illustrated in this embodiment comprises a unitary platelike member which may be formed of sheet metal or plastic material and is shaped in substantially frusto-pyramidal form having an elongated planar central portion 46 to which the pin or shaft 20 is anchored at its center. Opposed panel portions 48 of trapezoidal form extend at an angle to the plane of the central part 46 and the element 10 from the elongated sides of the central portion 46. The panels 48 terminate in marginal flanges 50 which are adhered in face engagement with the margins of the element 10. Central longitudinal offset ribs 52 are formed in the panels 48 in alignment and each preferably extends from the edge of flange 50 and across the panel 48 to the central portion 46. These offsets or ribs 52 provide a measure of compliance or flexibility in the panel 48. The remaining panels 54 of trapezoidal form and integral with the central portion 46 and the panel portions 48 above described extend from the narrow end portions of the central portion 46 in inclined relation to the element 10 and have flanges 56 at their outer margins which are adapted to be secured to the margin of the element 10. As best seen in Fig. 7, the construction of the frusto-pyramidal member is unitary or integral throughout. Any rotation imparted to the member 20 acts upon the element 10 along the diagonal ridge lines between the panels 48 and 54 and imparts to the element 10 the same type of distortion illustrated diagrammatically in Fig. 1. This distortion is accommodated by the provision of the compliance rib 52 in the panels 48 which prevents the unitary transmitting member from reinforcing the element 10 in a distortion resisting manner as might otherwise occur.

Figure 8:
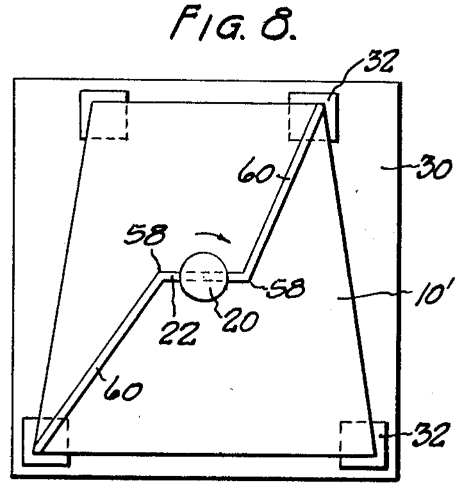
Fig. 8 is a face view of another embodiment of the invention.

Fig. 8 illustrates another embodiment of the invention applied to an element 10' of trapezoidal form. In this connection, as hereinabove mentioned, it will be apparent that the element 10 in each of the embodiments described herein may be trapezoidal or other non-rectangular form if so desired. The element 10' is illustrated as being mounted upon a base plate 30 by means of the compliant resilient members 32 hereinabove described with reference to the construction in Figs. 3 and 4. The harness in this instance is made of wire or rigid strap material and comprises a central portion 22 of short length secured to the pin or stud 20 and spaced from and substantially parallel to the face of the element 10'. The wire or strap is bent at 58 with its end portions 60 of equal length and substantially equiangularly related to the central portion 22. The members 60 extend at an angle to the face of the element 10' and are cemented at diagonally opposed corners of the element 10' in the manner hereinabove mentioned. It will be observed, by comparison of this form with Fig. 3, that the construction is substantially the same as the construction in Fig. 3 with respect to the member 22 common to each and the similarity of the parts 60 and the parts 24' of the Fig. 3 construction. The parts 24 of the Fig. 3 construction are omitted. In operation, assuming the device is used as a vibration pick-up, any rotative motion of the member 20 in the direction of the arrow shown in Fig. 8 is translated to the element 10' by the harness 22, 60 to cause the members 60 to pull diagonally inwardly upon opposed corners of the element 10' to thereby compress the element 10' in its plane. This action leaves the opposite corners free to expand incident to the distorting action upon the element 10' which has been described above.

Figure 9:
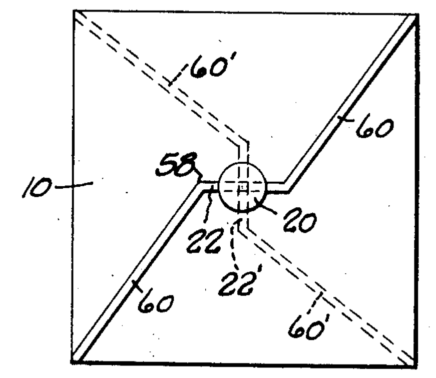
Fig. 9 is a face view of an embodiment of the invention similar to the embodiment shown in Fig. 8.
Figure 10:
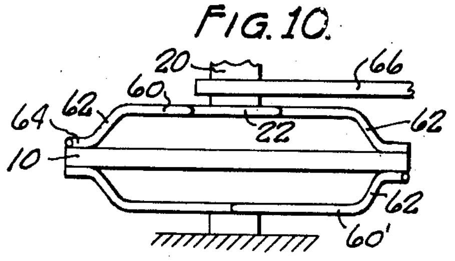
Fig. 10 is an edge view of the embodiment shown in Fig. 9.

In Figs. 9 and 10 is illustrated another embodiment of the invention comparable to that shown in Fig. 5, wherein the harness 22, 60 and 22', 60' connected with the pin or shaft 20 is the same as that illustrated in Fig. 8 with a harness 22', 60' located at the side of the crystal opposite the side at which the harness 22, 60 is located. It will be observed with reference to Fig. 10, however, that the central portions of the arms 60 in this form extend in coplanar relation to the members 22 with their outer ends being sharply bent at 62 toward the element 10 and their terminal portion 64 bearing flat against the element 10 to be adhesively anchored to said element. In this instance the pin 20 is illustrated as connected to an elongated rotation transmitting pick-up arm 66 of the character adapted to mount a stylus; or to impart a driving action to a speaker diaphragm, a record cutter, or any other means to be operated when the element 10 is used as a vibration producing means.

Figures 11, 12:
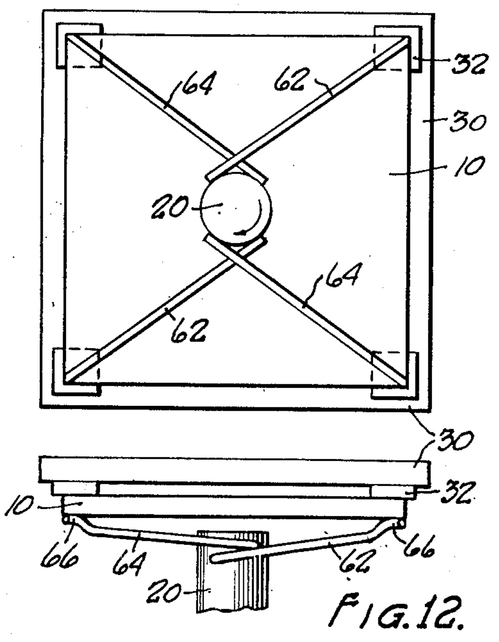
Fig. 11 is a face view of another embodiment of the invention.
Fig. 12 is an edge view of the embodiment shown in Fig. 11.

Another embodiment which the invention may take is illustrated in Figs. 11 and 12. In this form a plurality of rigid wires or strips 62 and 64 are welded, soldered or otherwise suitably secured to the pin or shaft 20 and each extends to one of the corners of the piezo-electric element 10. In these drawings the piezoelectric element 10 is illustrated as mounted upon a base 30 by members 32 of the character hereinabove described, although it will be understood that a mounting of other form providing flexibility and compliance may be used if desired. It will be observed that the members 62 extend in substantially parallel relation and are connected to diagonally opposed corners of the element 10 with their inner ends being anchored to the pin or shaft 20 in diametrically opposed relation. The members 64 are connected to the other pair of diagonally opposite corners of the element 10 and likewise are secured at their inner ends at diametrically opposite sides of the pin 20. Therefore it will be observed that when the pin 20 is rotated in the direction of the arrow in Fig. 11, a pulling force will be exerted upon the members 64 and a pushing force will be exerted upon the members 62, thereby causing the distortion or stressing of the piezo-electric element in its own plane and in the manner illustrated in Fig. 1. As best illustrated in Fig. 12, the member 20 will terminate in spaced relation to the face of the element 10 in this form and the members 62 and 64 will extend at an angle to the element 10 to be connected thereto at their outer ends at offset portions 66 thereof.

Figure 13:
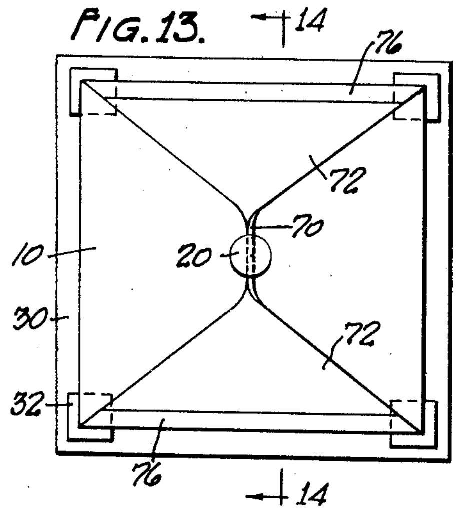
Fig. 13 is a face view of another embodiment of the invention.
Figure 14:
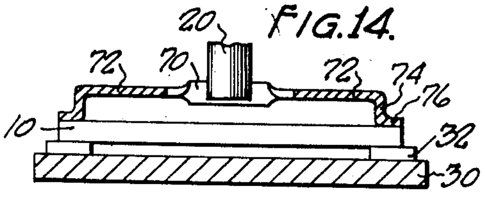
Fig. 14 is a sectional view of the embodiment shown in Fig. 13, taken on line 14—14 of Fig. 13.

Another embodiment of the invention is illustrated in Figs. 13 and 14 wherein the element 10 is shown as mounted upon a base 30 by means of the compliant or resilient members 32. The harness which is mounted upon the pin 20 and which is in turn secured to the element 10 in this form is preferably in the nature of a sheet metal stamping or a molded plastic member which is characterized by a central web 70 disposed in a vertical plane and twisted substantially at right angles to a pair of substantially triangular panel portions 72 formed integrally therewith and having their outer marginal portions offset at 74 to provide terminal flanges 76 adapted to be cemented to the face of the element 10. The web 70 joins the triangular plates 72 at their central apices whereby the opposite edges of the panel 72 diverge from the web 70 to adjacent corners of the element 10 at one side thereof. It will be understood that the panel 72 may be inclined relative to the element 10 and the web 70 if desired, instead of being formed in the stepped shape illustrated.

Each of these embodiments of the invention is characterized by the energization of the piezo-electric element 10 or 10′ regardless of its shape by a rotative vibrating member. This provides a very simple structure which is effective for the purpose of energizing the piezo-electric element to generate a voltage and has numerous advantages as hereinbefore mentioned. Among these advantages are the provision of leverage of any desired extent between the pick-up stylus and the pin or stud 20, the accommodation of flexibility of such an arm, as the arm 66 illustrated in Fig. 10, in a plane parallel to the axis of the pin 20, and the flexibility of mounting which insures that only vibration imparted to the element 10 through its actuator, that is through actuation in a rotative direction of the pin or stud 20, will serve to energize or activate the element 10. It will be observed that this arrangement avoids the necessity of providing complicated motion transmitting connections as is required in many devices which operate on a linear reciprocation principle, and that the device is particularly well suited for inexpensive and economical construction and manufacture. The above advantages apply equally whether the device is used as a vibration pick-up or as a vibration producing means when electrically actuated. In the latter instance it will be obvious that the rotative vibration produced, i. e. of the pin or shaft 20, is very simply and easily hooked up with the mechanism or member to be driven thereby as through the medium of an arm such as the arm 66.

One of the particular advantages of the device is that it is possible to generate in a single piezo-electric element a voltage of the same character and value which is now produced in piezo-electric devices using two piezo-electric elements. Thus all conditions of use and requirements, electrically and mechanically, for such a device can be satisfied fully with the instant construction.

Particular attention is directed to the advantages which result from the mounting of the piezo-electric element by harness means similar to the harness means by which the piezo-electric element is connected with the pin or stud 20. Specifically, these harness means are illustrated in Figs. 5 and 10, although it will be understood that a harness of other types than those shown in said figures may be used. In other words, the harnesses at the two faces of the element 10 may be substantially identical in construction to simplify the manufacture and permit standardization, and that the particular harness may be of any of the types herein illustrated or of any other type found suitable and advantageous and operating upon the same principle of transmitting a rotative force into an action for distorting the piezo-electric element in its plane and in the manner illustrated in Fig. 1. Obviously, in addition to the force multiplying action of such a mounting as compared to the mounting comprising a base, such as 30, and a compliant mounting element, such as that shown at 32, the harness which is connected to the supporting member, such as the member 44 of Fig. 5, offers greater protection for the piezo-electric element by virtue of the fact that it constitutes a spring mounting for that element. This permits the device to be subjected to rough usage and treatment without damage.

While the various embodiments of the invention illustrated herein have all been shown and described as having either the application of rotative oscillation at the pin or stud 20 for transmission through the bridging structure or harness to the piezo-electric element or a reverse operation wherein oscillation of the pin or stud 20 is produced by the action of the piezo-electric element when electrical energy is applied thereto, the devices may all be used in a different manner; for example, both the mounting for the piezo-electric element 10 and the stud or shaft 20 may be securely anchored and held against movement and the piezo-electric element may be rotatably oscillated. This may be accomplished by applying a force either directly to the piezo-electric element to cause rotatable oscillation thereof or by applying such a force to a marginal portion of the bridging structure or harness associated with the pin or shaft 20 in any of the forms illustrated herein or other forms of equivalent structure. It will be apparent that such rotatable oscillation of the piezo-electric element will produce the same voltage generating distortion of the piezo-electric element in its plane which is illustrated in Fig. 1. Likewise, where the piezo-electric device is used to impart or produce vibration when electrically energized, the resultant distortion of the piezo-electric element will produce vibration of means positioned in driving relation either to the perimeter or margin of the piezo-electric element or to the outer portion of the bridging structure or harness associated with the pin or shaft 20.

It will be understood that, while various embodiments of the invention have been illustrated and described herein, such embodiments are illustrative only of a construction, and any other embodiment or form may be made which falls within the scope of the appended claims without departing from the spirit of the invention.

We claim:

1. A piezo-electric device comprising a support, a piezo-electric element, yielding means mounting said element on said base, a substantially rigid structure bridging said element and anchored to opposite marginal portions of said element, said structure including an intermediate portion angularly displaced relative to its end portions, said intermediate portion and element being adapted for relative rotating vibration to stress said element in its plane, said yielding means constituting a second bridge structure disposed on the opposite side of said element from said first bridge structure.

2. A piezo-electric device comprising a piezo-electric element, means resiliently mounting said element, a member positioned adjacent to one face of said element in substantially centered relation to said element, and a susbtantially rigid harness secured to said member and to diagonally opposite marginal portions of said element, said harness extending in angularly displaced relation to the diagonal of said element at which its ends are secured whereby to accommodate diagonal distortion of said element in its plane upon rotation of one of said harness-connected parts relative to the other.

3. A piezo-electric device comprising a piezo-electric element, means resiliently mounting said element, and a structure bridging said element and anchored at opposite marginal portions thereof, said structure including a central element and divergent portions projecting laterally therefrom and in spaced relation to the axis of said central element, to accommodate planar distortion of said first element upon relative rotations of one element relative to the other.

4. A piezo-electric device comprising a piezo-electric element, yielding means mounting said element, and a structure bridging said element and including a central rotatable portion and a plurality of angularly disposed portions each anchored to the margin of said element and divergently arranged relative to and spaced from the axis of rotation of said central portion whereby relative rotation of said central portion and said element stresses said element in one manner along one transverse portion in its plane and in an opposite manner along an angular disposed transverse portion in its plane, said element mounting means constituting a similar element-bridging structure.

5. A piezo-electric device comprising a piezo-electric element, yielding means mounting said element, and a rigid spider unit including a central portion and a plurality of divergent arms, said arms being secured to said element and so related to said central portion that upon relative rotation of said central portion and said element two opposed arms exert outwardly pushing action on said element in its plane and at least one arm disposed angularly to said first arm exerts an inward pulling action on said element in its plane.

6. A transducer comprising an element formed of a material generating an electric potential when distorted, yielding means mounting said element, and a rigid connector unit including a central portion and two pairs of parts secured to the margin of said element at the respective ends of centrally intersecting transverse axes thereof, said pairs being angularly displaced relative to the transverse axes of said element correlated therewith one of said pairs transmitting tension and the other pair simultaneously transmitting compression in the plane of said element upon relative rotation of said element and said central portion.

7. A transducer comprising an element adapted to generate an electrical potential upon distortion thereof, yielding means mounting said element, and a rigid connector unit including a first portion and two pairs of parts diverging from said first portion and secured to the margin of said element at the respective ends of angularly disposed centrally intersecting transverse axes thereof, said pairs of parts being angularly displaced from said axes whereby one of said pairs transmits tension and the other pair simultaneously transmits compression to said element in the plane of said element upon relative rotation of said element and said first portion, said element mounting means comprising a unit similar to said connector unit.

8. A piezo-electric device comprising a piezo-electric element, a yielding mount for said element, a member adjacent to said element and substantially centered therewith, said element and member being adapted for relative rotative oscillation, and a rigid bridge spanning said element and having end portions secured to opposed marginal portions of said element, said bridge having an intermediate portion secured to said member and angularly disposed to said end portions whereby said end portions are laterally off-set relative to a straight line connecting the ends of said bridge.

9. A piezo-electric device comprising a piezo-electric element, a yielding mount for said element, a member adjacent to said element and substantially centered therewith, said element and member being adapted for relative rotative, oscillation, and a rigid bridge spanning said element, said bridge having a short central portion secured to said member and a pair of arms diverging from each end of said central portion and each secured to the marginal portion of said element at its outer end to distort said element in its plane upon relative rotative oscillation of said element and member.

10. A piezo-electric device comprising a piezo-electric element, a yielding mount for said element, a member adjacent to said element and substantially centered therewith, said element and member being adapted for relative rotative oscillation, and a rigid bridge spanning said element, said bridge having a short central portion secured to said member and a pair of arms diverging from each end of said central portion and each secured to the marginal portion of said element at its outer end, said arms being weakened adjacent their junction with said central portion.

11. A transducer comprising a body adapted to generate an electric potential upon distortion thereof, yielding means mounting said body, and a structure bridging said body and including a first portion and a plurality of portions diverging from said first portion at an angle thereto and fixedly anchored to the margin of said body, said first portion being rotatively oscillatable relative to said mounting means and said diverging portions stressing the portion of the body between said anchor points to distort the body in its plane and relative to the remaining portions of said body upon rotative oscillation of said first portion.

12. A transducer as defined in claim 11, wherein the inner ends of said diverging portions are connected with the first portion at spaced points in opposed relation to the axis of rotation of said first portion.

13. A transducer as defined in claim 11, wherein each of said diverging portions includes a part off-set from a line joining the axis of rotation of said first portion and the point at which said diverging portion is anchored to said body.

14. A piezo-electric transducer comprising a flat piezo-electric crystal generally determining a crystal plane and having two axes lying in the crystal plane and intersecting at a central portion of said crystal, said crystal remaining flat but changing its axial dimensions during transducer action, the change in dimension along one axis being algebraically opposite to the change in dimension along the other axis, means oscillatable about an axis perpendicular to the crystal, said oscillation axis intersecting the crystal at its central portion, at least two rigid members coupled to marginal portions of said crystal at the two axes and extending generally parallel to said crystal plane toward said oscillatable means and coupled thereto eccentric to said axis of oscillation about said axis of oscillation, vibratory energy for transducer action being in the form of angular oscillation of said oscillatable means.

15. The transducer according to claim 14 wherein said piezo-electric crystal has the outline of a quadrilateral and four rigid members are provided extending from the four corners thereof.

16. The transducer according to claim 14 wherein a means for restraining and mounting said crystal comprises rigid members coupled to marginal portions of said member and coupled eccentrically to a support lying along the oscillation axis.

17. A piezo-electric transducer comprising a flat piezo-electric crystal generally determining a crystal plane and having two axes lying in the crystal plane and intersecting at a central portion of said crystal, said crystal remaining flat but changing its axial dimensions during transducer action, the change in dimension along one axis being algebraically opposite to the change in dimension along the other axis, a member oscillatable about an axis perpendicular to the piezo-electric crystal, said oscillation axis intersecting the crystal at its central portion, four rigid members coupled to marginal portions of said crystal at the two axes and extending generally parallel to said crystal plane toward said oscillatable member and coupled thereto eccentric to said axis of oscillation and means for restraining said crystal against oscillation about said axis of oscillation.

18. The transducer according to claim 17 wherein two adjacent rigid members are coupled to the same point on said oscillatable member and wherein the remaining two rigid members are coupled to another point on said oscillatable member.

19. A transducer comprising a flat piezo-electric crystal generally determining a crystal plane and having the shape of a rectangle and having two axes lying in the crystal plane and intersecting at a central portion of said crystal, said crystal remaining flat but changing its axial dimensions during transducer action, the change in dimension along one axis being algebraically opposite to the change in dimension along the other axis, a member oscillatable about an axis perpendicular to the crystal, said oscillation axis intersecting the crystal at its central portion, at least two elongated members extending from the crystal corners toward said oscillatable member and being generally parallel to the crystal plane, said elongated members being bent to provide straight portions forming angles therebetween, said oscillatable member being adapted to operate said elongated members to provide a crank and lever action.

20. A transducer comprising a flat piezo-electric crystal generally determining a crystal plane and having a rectangular outline with two diagonal axes lying in the crystal plane and intersecting at a central portion at said crystal, said crystal remaining flat but changing its axial dimensions during transducer action, the change in dimension along one axis being algebraically opposite to the change in dimension along the other axis, a member oscillatable about an axis perpendicular to the crystal plane, said oscillation axis intersecting the crystal at its central portion, four arms coupled to the four crystal corners extending generally parallel to the crystal toward the center thereof, and means for coupling the inner ends of said arms to said oscillatable member at points out of line with the crystal diagonals, said oscillatable member providing a pulling force on two diagonally disposed arms and a pushing on the remaining two diagonally disposed arms and means for restraining the crystal against rotational movement in its own plane.

21. The structure of claim 20 wherein two adjacent arms are coupled to said oscillatable member at one point and the remaining two arms are coupled to said oscillatable member at another point.

22. The structure of claim 20 wherein the means for restraining the crystal against rotational movement comprises four additional arms on the other side of said crystal in a manner resembling the first four arms and wherein a stationary member in line with said oscillatable member is coupled to the inner ends of said additional arms at points out of line with the crystal diagonals.

ALPHA M. WIGGINS.
FRED S. LEWIS.

REFERENCES CITED

The following references are of record in the file of this patent:

UNITED STATES PATENTS

| Number | Name | Date |
|---|---|---|
| 1,802,780 | Sawyer | Apr. 28, 1931 |
| 1,995,461 | Rockwell | Mar. 26, 1935 |
| 2,139,998 | Clark | Dec. 13, 1938 |
| 2,207,539 | Gravley | July 9, 1940 |
| 2,386,279 | Tibbetts | Oct. 9, 1945 |
| 2,387,108 | Arndt et al. | Oct. 16, 1945 |